United States Patent [19]

Coffin et al.

[11] 3,968,285

[45] *July 6, 1976

[54] ONE-PART FOAMABLE LATEX COMPOSITION

[75] Inventors: Perley A. Coffin, Gloucester; Philip G. Cook, Newton; Paul D. Demerjian, Andover, all of Mass.

[73] Assignee: General Latex and Chemical Corporation, Cambridge, Mass.

[ * ] Notice: The portion of the term of this patent subsequent to July 13, 1993, has been disclaimed.

[22] Filed: Feb. 4, 1974

[21] Appl. No.: 439,602

Related U.S. Application Data

[63] Continuation of Ser. No. 257,398, May 26, 1972, which is a continuation-in-part of Ser. No. 124,514, March 15, 1971.

[52] U.S. Cl. .............................. 428/95; 260/2.5 L; 260/2.5 HB; 260/5; 260/29.7 P; 260/29.7 NQ; 260/29.7 SQ; 260/723; 260/815
[51] Int. Cl.² ...................... B32B 5/28; C08J 9/30; C08L 7/02; C08L 9/10
[58] Field of Search ................ 260/2.5 L, 29.7 NQ, 260/29.7 SE, 29.7 SQ, 723, 815, 5; 428/95

[56] References Cited
UNITED STATES PATENTS 2,519,887 8/1950 Chassaing .......................... 260/815

FOREIGN PATENTS OR APPLICATIONS 862,114 3/1961 United Kingdom .............. 260/2.5 L

*Primary Examiner*—Wilbert J. Briggs, Sr.

[57] ABSTRACT

A one-part foamable latex composition, the method of preparing the composition, and the foams prepared therefrom, which composition comprises a natural or synthetic latex or blends, ammonia, a curing system, and an ammonia-retardant accelerator, such as zinc dibenzyl dithio carbamate accelerator, the latex having a total solids content of from about 55% to 85% by weight. The latex composition is capable of being stored for a long period of time without gellation or precure prior to use, and of being foamed without the addition of other components.

25 Claims, No Drawings

ONE-PART FOAMABLE LATEX COMPOSITION

REFERENCE TO PRIOR APPLICATION

This is a continuation of application Ser. No. 257,398, filed May 26, 1972 which application is a continuation-in-part of application Ser. No. 124,514, filed Mar. 15, 1971.

BACKGROUND OF THE INVENTION

Both natural and synthetic elastomeric latex compositions and blends thereof have been employed in the preparation of foam products, such as foam backings for tufted carpets. Typically, the preparation of a latex foam has required a multicomponent latex composition wherein a latex user has been required to mix the component parts of the latex composition just prior to use. The latex composition so mixed is then foamed by mechanically whipping in air with, for example, an Oakes foamer, and then depositing the latex froth on a surface, such as a back of a carpet, a belt or a mold, and heating to effect the desired gel embossing and cure of the foam. Some disadvantages of such conventional latex foam manufacture have been the necessity of shipping a multiple-part mixture to the customer and requiring the customer to mix the component parts just prior to use, as well as to employ a foamer device containing proportioning pumps.

The division of a foamable latex into its component parts for shipment to a customer may involve two, three, four or even more different component compositions. A supplier might furnish a latex customer a multicomponent foam packaging comprising four separate components. A first component would comprise a natural or synthetic gellable, vulcanizable elastomeric latex, such as natural rubber or a styrene-butadiene rubber, with a foaming agent, such as surfactants or frequently potassium soaps. A second component would comprise various vulcanizing or curing agents (and cross-linking ingredients where required), together with an accelerator or combinations of accelerators known as a curing system. Some accelerators would include metal alkyl xanthates, salts of N-substituted dithio carbamic acid, thiazoles, thiurams, and other compounds. Commonly used as accelerators are the zinc salts of dialkyl dithio carbamates. Optionally, antioxidants and stabilizers may be added, and where necessary, a cross-linking agent used, for example, in carboxylated latices a melamine or urea-formaldehyde resin or isocyanate compound, or peroxides used. The materials of the second component, if included in the first component, would result in a precure or premature gellation of the mixed components so that when the foam is prepared, it is friable when deposited or would not be capable of being embossed. In addition, the mixture of the first and second components would not permit long-term storage without an undesirable gellation or precure, or both. Gellation refers to the change of a latex system from a liquid to a solid, while precure refers to the premature change in the elastomeric and chemical structure and properties of the polymer. Both gellation and precure may affect the storage life and ultimate use of a latex composition.

The third component is typically a gelling or coagulating agent which lowers the pH of the latex composition and destabilizes the latex to obtain coagulation after foaming through a chemical reaction. Gelling agents employed would include a fluoride, such as sodium silicofluoride, or a hydrolizable salt such as an ammonium salt such as ammonium acetate. An optional fourth component would include fillers and pigments which may be supplied by the manufacturer in dispersion form for ultimate mixing by the customer or in dry form for dispersion and mixing by the customer. Such multicomponent systems have many disadvantages associated with their preparation, shipment, and ultimate use. It is desirable, therefore, to provide a latex composition and method which would overcome such disadvantages, and particularly, to provide a foamable latex composition which could be shipped and stored for extended periods of time without precure or gellation.

U.S. Pat. No. 3,491,033 describes a two-part latex composition for foaming wherein the latex is specially compounded at a high solids content to be free of agents capable of gelling the wet foam. Such high solids no-gell foam compositions have the disadvantage of generally requiring a single pass oven for their use as they depend solely on water removal to gell the high solids latex.

Our parent application provides for a one-part foamable latex by employing a heat-sensitizing agent, such as a siloxane, in combination with an ammonia-retardant accelerator. Such foamable latex compositions have many advantages over the prior art multiple-component mixtures in that such compositions may be stored for extended periods of time without interfering precure, while avoiding difficulties and errors associated with a user's mixing components prior to foaming.

SUMMARY OF THE INVENTION

Our invention concerns a unique latex composition wherein curing agents and accelerators may be employed directly together in a one-component mixture with the gellable polymeric latex and the composition stored for extended periods of time without adverse precure or gellation effects. Our invention also concerns the method of preparing such latex composition, the use of such latex composition and the products prepared therefrom.

In particular, our latex composition is suitable for use as a one-part gellable foamable latex composition which may be shipped to and stored by customers prior to use without substantial diminution in the quality of the latex or foam product produced therefrom. More particularly, our invention eliminates the requirement of the past practice in the art of maintaining the curing system separate from the polymeric latex until just prior to use. Our invention is advantageous in the preparation of a foamable latex composition, but also may be used directly in the production of cured natural and synthetic elastomers, in dipping, extruding and molding, as in slush-molding operations.

We have found that a unique, storable latex composition which contains a gellable curable natural or synthetic elastomer, together with curing ingredients and accelerators, is prepared by employing in the latex an ammonia-retarded accelerator in combination wtih a high solids content of at least about 55% by weight. We have discovered a one-component latex composition which includes in admixture a natural or synthetic elastomeric curable polymer in latex form, a curing system for such elastomer, ammonia, and an accelerator which, in the presence of ammonia, does not function to accelerate the cure of the latex. The latex composition must have a solids content of from about 55% to 85% by weight. Such latex composition, after storage, may be used or foamed in the conventional manner and produce curable and gellable foams.

We have found that a one-part foamable latex composition may be prepared by substituting the heat-sensitizing agent used in our parent application with a high total solids content of the latex composition. Our foamable latex composition may be stored as before for extended periods of time without precure and foamed by the user without the addition of mixing of other components. One distinct advantage of our composition is that it permits a user to prepare a test foam sample prior to preparation of a production run, and, as before, avoids waste of leftover material at the end of a production run. We have discovered that the heat-sensitizing agent may be omitted if desired, provided that the total solids content of the latex is at least about 55% by weight, preferably, of from about 65% to 80% by weight. We have found that as the solids content decreases, the desirable properties of the foam produced decrease, such as an increase in surface cracking, which affects the appearance and a cellular structure which is irregular and nonuniform. Foams prepared from our one-part latex composition having a solids content of from 70% to 80% exhibit no surface cracking, excellent smooth surface appearance, and smooth and uniform cellular structure.

Our one-part latex composition may be prepared with a siloxane heat-sensitizing agent, and at a high solids content. However, gelling agents, such as acidic compounds like sodium silicofluoride, ammonium acetate of oleic acid, which would destroy the foaming agents in the composition, or change the pH, should not be used. These gelling agents may be added to the composition, if desired, just prior to foaming.

Our one-component high solids latex composition comprises:

a. curable or cross-linkable, natural or synthetic polymer; e.g., elastomeric latex, particularly those unsaturated copolymers, such as conjugated diene elastomers as natural rubber or styrene-diene, such as styrene, butadiene copolymers, as well as carboxylated styrene-butadiene and similar unsaturated curable elastomers and polymers subject to curing or cross-linking;

b. a curing system, such as curing agents like sulfur and activators like zinc oxide, and where required, crosslinking agents and similar materials in conventional amounts;

c. a volatile base such as ammonia, either naturally present, as in natural latex, or added; and d. an accelerator which is inhibited from accelerating the curing system in the presence of ammonia, such as zinc dibenzyl dithio carbamate, which is the accelerator particularly preferred. A user may add at the time of use filler or color dispersion as required.

We have found that latex compositions containing the conventional zinc dialkyl dithio carbamate as accelerators in the curing system, such as the zinc dimethyl, diethyl and dibutyl dithio carbamates, do not permit the advantages of our invention. Such accelerators when used in a latex containing an oxyalkylene siloxane heat-sensitizing agent provide latex compositions which exhibit gellation and precuring tendencies and may not be stored for extended periods of time. Our composition permits gellation on heating the latex composition and curing on driving off the ammonia. The combination of a high solids content and an amonia-retarded ultra accelerator, such as zinc dibenzyl dithio carbamate, is employed in the presence of an ammonia base in the latex which is naturally present in natural rubber latex or which may be added to the natural rubber or other elastomers. Our latex compositions may be cured through the removing of the ammonia, for example, even at room temperature; e.g., 70°–90°F. More typically, our latex compositions are cured in production by heating; e.g., over about 300°F, to drive off the ammonia, thereby permitting the accelerator to function and the curing mechanism to proceed.

The natural and synthetic unsaturated polymeric latices and blends thereof described, for example, in U.S. Pat. Nos. 3,255,140; 3,484,394; 3,491,033; and 3,551,359, may be employed in our invention as well as other sulfur-cured natural and synthetic polymers, such as diene and conjugated diene vulcanizable elastomers and those materials and blends which contain pendant reactant groups, such as sulfonic or carboxylic acid groups, such as those present in carboxylated unsaturated curable synthetic latices, such as carboxylated diene rubber like styrene-butadiene copolymers. If desired, amounts up to about 25% by weight, such as 5% to 20%, of other polymeric latex compositions may be used to impart other properties, such as for the introduction of halide radicals for fire-retarding, etc.. Such other blending components would include latices of polyvinyl chloride, urethane resins and elastomers, acrylic resins and vinyl-acrylic copolymers.

Any accelerator or combination thereof which is inhibited in its acceleration function by the presence of ammonia may be employed in combination with the high solids content in order to provide the one-component latex compositions of our invention. We have found that zinc dibenzyl dithio carbamate is a preferred ammonia-inhibited ultra accelerator which may be employed. The polyvalent heavy metal salt dibenzyl dithio carbamate may be used with other accelerators, such as in synergistic combinations where the other accelerators are not active to induce precure in the latex. The corresponding zinc alkyl N-substituted dithio carbamate acid salts cannot be suitably employed, since such salts are not inhibited in the presence of ammonia, but tend to function as accelerators at room temperatures. The ammonia-inhibited accelerators are employed in from about 0.25 to 5.0 parts per hundred parts of the elastomer; e.g., 1.0 to 3.0. Sufficient ammonia is employed to prevent and retard the acceleration, typical amounts ranging from about 0.2 to 3.0; e.g., 0.3 to 2.0, parts per hundred (theoretical dry weight) of the elastomer.

In addition to the ingredients specified in our one-component latex composition, it is recognized that other and conventional ingredients and additives may be employed, either separately or in combination; for example, fillers, pigments, stabilizers, antioxidants, other curing agents, fire retardants, dyes, oils, plasticizers, surfactants, foaming agents, high temperature accelerators (e.g., over 200°F), and similar materials may be incorporated in latex compositions as desired.

Our latex compositions are particularly adapted to be foamed, gelled, dried (optionally embossed) and cured, and to provide a latex foam, such as for a carpet backing, foam drapery fabrics, clothing, or for other uses. The latex composition may be foamed as received or after storage by mechanically incorporating therein air or other gas. The foam or froth layer is heated to a temperature sufficient to cause gellation, the gelled foam embossed, if desired, by embossing rolls, and the foam subsequently dried and cured by heating at an elevated temperature; e.g., 200° to 400°F. Our latex compositions may also be usefully employed with or without foaming; for example, in a dipping operation, such as for making thin wall articles by immersion techniques, and more particularly, due to its one-component nature, our latex compositions may be usefully employed in molding operations, such as in the slush molding manufacture of articles, such as footwear like boots and rubbers. For example, a small amount of our latex composition may be incorporated into a rotating slush mold deposited on the wall surface, or introduced into a heated mold and then the excess amount drained off, or be directly introduced in the desired amount into a mold. The mold spoken of may contain embossed or engraved features on the walls thereof, so the resulting product will contain such impression.

The advantages of our latex composition over the prior art are many and include the advantage that the latex may be shipped and stored in bulk. Either a Hobart whip or just a foam blender is required; that is, separate proportioning of the ingredients while preparing the foam is not required, such as in an Oakes foamer. In addition, rather than a single pass oven, a two, three or multiple pass oven or drying technique can be used to gell, dry and cure the latex foam; for example, a three-stage oven to accomplish separate gellation, drying and curing steps. The heating may take place by the use of a hot air oven, steam chambers or radiant heat sources, such as infrared heat, or any combination thereof. Further, advantages of our latex compositions would include that such compositions may be used in small quantities with the disadvantages of separately mixing the components obviated. Another advantage is that the compounder may test the latex formulation before shipment to the user, so that better control over the manufacture of the formulation may be obtained.

EMBODIMENTS OF THE INVENTION

Our invention is illustrated by, but not limited to, the following latex compositions and examples:

EXAMPLE 1

A one-part foamable latex composition comprising a blend of natural rubber and styrene-butadiene latex in accordance with our invention was prepared employing the following formulation:

|   |   | Wet Parts | Dry Parts |
|---|---|---|---|
| 1) | Pliolite[1] Latex 5352 (69% Solids) | 145.00 | 100.00 |
| 2) | 20% Potassium Oleate soap frothing agent | 5.00 | 1.00 |
| 3) | 50% Antioxidant dispersion | 3.25 | 1.75 |
| 4) | 25% Dispersing agent | 2.50 | 0.63 |
| 5) | 20% Sodium metaphosphate frothing agent | 7.50 | 1.50 |
| 6) | 30% Sodium alkyl sulfate soap frothing agent | 3.00 | 0.90 |
| 7) | 35% Disodium N-octadecyl sulfosuccinamate frothing agent | 4.50 | 1.58 |
| 8) | Ammonia 26° Baume' | 2.00 | — |
| 9) | Water | 10.00 | — |
| 10) | 20% Potassium Hydroxide | 1.00 | 0.20 |
| 11) | 50% Zinc oxide dispersion activator | 6.00 | 3.00 |
| 12) | 66.7% Sulfur dispersion curing agent | 3.00 | 2.00 |
| 13) | 40% Accelerator dispersion (Zinc salt of mercapta benzothiazole) | 6.25 | 2.50 |
| 14) | 35% Activator dispersion (Zinc dibenzyl dithiocarbamate) | 3.00 | 1.05 |
| 15) | 50% Wax emulsion | 4.00 | 2.00 |
| 16) | 50% Silicone emulsion-bonding agent | .40 | 0.20 |
| 17) | Filler | 165.00 | 165.00 |
| 18) | Polyacrylate thickener | 1.00 (or as required) | 1.00 |
|   | Total | 372.40 | 284.31 |

[1] A trademark of Goodyear Tire and Rubber Co. for styrenebutadiene copolymers

The one-part foamable latex composition above was prepared by adding Items 2–17 to Item 1 in order with agitation, followed by the addition of all or part of Item 18 under agitation to obtain the desired viscosity. A desirable viscosity for our formulation would be from about 2000 to 3000 cps; e.g., 2500 as measured by a Brookfield viscometer RVF employing No. 5 spindle at 4 RPM. Acceptable cured foam products have been made when the total solids content of the latex composition has been varied from 55% to 85%.

EXAMPLE 2

The formulation as set forth in Example 1 was prepared in the same manner, except that the ultra accelerator, zinc dibenzyl dithiocarbamate, was replaced by zinc dibutyl dithiocarbamate.

EXAMPLE 3

The formulations of Examples 1 and 2 were frothed by whipping in air employing a laboratory mixer to obtain a density of approximately 15–18 lbs. per cubic foot (dry basis), which constitutes a medium density foam. Foam density may be frothed from 10 to 25 lbs. per cubic foot. The frothed latex composition was then spread out on a substrate, such as a cardboard, to a thickness of approximately 3/16 of an inch, and the frothed foam then cured in an oven at a temperature of about 300°F for 10 minutes. After curing, the cured latex foam was examined for physical characteristics and tested for foam structure and strength. Each of the frothed latex foams so prepared were satisfactory.

The foam latex compositions were then stored for a period of time, and each were again frothed in the same manner as above, cured and examined. The formulation of Example 2 on examination exhibits a weak strength foam structure which would be unacceptable for commercial use, indicating that precure had occurred during the storage period. The formulation of Example 1 as representative of our invention showed no precure tendencies in the cured frothed foam and no change in characteristics from the cured foam as originally examined.

EXAMPLE 4

The formulation of Example 1 was varied in total solids content (TSC) of 55, 60, 65, 70, 75, 80 and 85 percent and cured foams prepared therefrom. The cured foam was then examined as to foam structure and appearance. It was found that foams prepared from formulations with less than about 55% TSC would be unacceptable due to surface cracking and irregular cellular structure, while the foams improved in both appearance and cell structure as the TSC rose with optimum foam prepared at 70 to 80 TSC.

Our one-part foamable latex composition has been described in particular employing a zinc dibenzyl dithiocarbamate as a representative example of the types of a volatile nitrogen base-inhibited ultra accelerator which may be employed. It is recognized that other ultra accelerators representative of other heavy metal salts and other organic constituents may be employed in the practice of our invention. Further, our examples have employed, as the base, ammonia as the preferred operating embodiment due to cost, volatility and performance. However, it is recognized that other bases may be employed, which bases can be evaporated or removed during or prior to the curing cycle, permitting curing to occur. Such volatile bases would include organic nitrogen-containing bases, for example, aliphatic, alicyclic and aryl amines, such as lower alkyl and alkylene amines. Representative examples include ethyl amine, quaternary ammonium hydroxide, morpholine, diethyl amine, isobutyl amine, etc..

EXAMPLE 5

Similar one-part foamable formulations may be prepared as in Example 1, employing only a natural rubber latex, or other unsaturated curable elastomers or blends thereof, which formulations would perform in a substantially similar manner as the formulation of Example 1. Formulations in which there have been substitutes of zinc diethyl dithiocarbamate for the zinc dibenzyl dithiocarbamate have also shown precuring tendencies in storage as the formulation in Example 2.

In commercial practice, our one-part foamable latex composition, such as in Example 1, may be stored by customer for extended periods of time, and then mechanically frothed with a mixer to a desired foam density; e.g., 6 – 10 lbs. per cubic foot, without any premixing of other components as in the prior art. The foam may be placed on the back of a tufted rug to a desired depth; e.g., 1/16 to 3/16 of an inch, and then heated to cure the latex, thereby providing a cellular-backed tufted rug.

Having thus described our invention, what we claim is:

1. A one-part foamable latex composition which may be stored for extended periods of time, which latex composition comprises:
   a. a natural or synthetic elastomeric latex subject to cure;
   b. a curing system which comprises an ammonia-retardent dithiocarbamate accelerating agent, which agent is inhibited in accelerating function in the presence of the base;
   c. a volatile nitrogen-containing base in an amount sufficient to inhibit the cure of the latex;
   d. a foaming agent in an amount to permit mechanical frothing of the latex composition into a foam; and
   e. the composition characterized by having a total solids content of from about 65% to 85% by weight, and the composition being free of a gelling agent capable of gelling the composition in storage, and free of a heat-sensitizing agent.

2. The latex composition of claim 1 wherein the latex is a synthetic diene elastomeric polymer.

3. The latex composition of claim 1 wherein the polymeric latex is a natural rubber, a styrene-butadiene elastomer, a carboxylated styrene-butadiene elastomer and blends thereof.

4. The latex composition of claim 1 wherein the total solids content is from about 70 to 80% by weight.

5. The latex composition of claim 1 wherein the accelerator is zinc dibenzyl thiocarbamate.

6. The latex composition of claim 1 wherein the accelerator is present in an amount of from about 0.25 to 5.0 parts per hundred parts of the elastomer.

7. The latex composition of claim 1 wherein the base is present in an amount of from about 0.2 to 3.0 parts (dry weight theoretical basis) per hundred parts of the elastomer.

8. The latex composition of claim 1 wherein the accelerating agent is a polyvalent heavy metal salt dibenzyl dithio carbamate.

9. The latex composition of claim 1 wherein the volatile base is ammonia.

10. A one-part foamable latex composition which comprises in admixture:
    a. a natural or synthetic diene conjugated elastomeric latex or blends thereof;
    b. a curing system which comprises zinc dibenzyl dithio carbamate accelerator in an amount of from about 0.25 to 5.0 parts per hundred parts of the elastomer;
    c. a foaming agent capable of permitting the composition to be prepared as a foam by mechanically beating in a gas;
    d. ammonia in an amount of from about 0.2 to 3.0 parts (dry weight theoretical basis) per hundred parts of the elastomer; and
    e. the composition characterized by a total solids content of from about 65 to 80% by weight and being free of gelling agents which would destroy the foaming agent and induce precure in storage and free of a heat-sensitizing agent.

11. The latex composition of claim 10 wherein the elastomer is a styrene-butadiene elastomeric copolymer.

12. In a process for producing a foamable latex composition, which latex composition comprises:
    a. a natural or synthetic elastomeric latex subject to cure;
    b. a curing system; and
    c. a volatile base in an amount sufficient to inhibit the cure of the latex, the base capable of being removed by heating, the composition being free of a gelling agent, the improvement which comprises:
    incorporating an ammonia-retardant di thio carbamate accelerating agent into the latex, which agent is inhibited in an accelerating function in the presence of the volatile base, and a foaming agent in an amount to permit mechanical frothing of the latex composition into a foam, and the composition characterized by a total solids content of from about 65% to 85% by weight, and free of a heat-sensitizing agent, thereby providing a one-part foamable latex composition which may be stored for extended periods of time prior to use.

13. The process of claim 12 wherein the latex is a synthetic diene elastomeric polymer.

14. The process of claim 12 wherein the polymeric latex is a natural rubber, a styrene-butadiene elastomer, and blends thereof.

15. The process of claim 12 wherein the total solids content is from about 70% to 80% by weight.

16. The process of claim 12 wherein the accelerator is zinc dibenzyl dithio carbamate.

17. The process of claim 12 wherein the accelerator is present in an amount of from about 0.25 to 5.0 parts per hundred parts of the elastomer.

18. The process of claim 12 wherein the base is ammonia and is present in an amount of from about 0.2 to 3.0 parts (dry weight theoretical basis) per hundred parts of the elastomer.

19. The process of claim 12 which includes curing the latex composition by heating the composition and evaporating the base therefrom.

20. The process of claim 12 which includes foaming the composition by mechanically beating air into the latex composition to form a froth, and heating the froth to evaporate the volatile base and dry and cure the elastomer, thereby providing a cured foam product.

21. The process of claim 20 which includes applying the froth to the back of a tufted rug prior to heating and curing the froth.

22. The process of claim 12 wherein the accelerating agent is a polyvalent heavy metal salt dibenzyl dithio carbamate.

23. In a process for producing a foamable latex composition, which latex composition comprises:
   a. a natural or synthetic elastomeric latex subject to cure;
   b. a curing system; and
   c. a volatile base in an amount sufficient to inhibit the cure of the latex, the base capable of being removed by heating, the composition being free of a gelling agent, the improvement which comprises:
   incorporating into the latex from about 0.25 to 5.0 parts per hundred parts of the elastomer of zinc dibenzyl dithio carbamate as an ammonia-retardant accelerating agent, and wherein the volatile base is ammonia present in an amount of from about 0.2 to 3.0 parts (dry weight theoretical) per hundred parts of the elastomer, the latex includes a foaming agent, and the composition is further characterized by a total solids content of from about 65% to 80% by weight, and free of gelling agents which induce gelling during storage of the composition and free of a heat-sensitizing agent.

24. The process of claim 23 which includes:
   a. foaming the latex by mechanically beating air into the latex composition to form a froth;
   b. applying the froth to a substrate; and
   c. heating the froth to a temperature to drive off the ammonia and to cure the latex.

25. The process of claim 23 which includes applying the froth to the back of a tufted rug.

* * * * *